United States Patent [19]

Roxberry

[11] 4,015,540
[45] Apr. 5, 1977

[54] ELECTROMAGNETIC TRANSPORTATION SYSTEM

[75] Inventor: Richard C. Roxberry, Morristown, N.J.

[73] Assignee: The Port Authority of N.Y. & N.J., New York, N.Y.

[22] Filed: May 1, 1975

[21] Appl. No.: 573,397

[52] U.S. Cl. .................... 104/148 LM; 310/13
[51] Int. Cl.² .......................... B61B 13/08
[58] Field of Search ............ 104/148 MS, 148 LM, 104/148 SS, 148 R, 138 R, 23 FS, 155, 156; 310/14, 12, 13; 336/205

[56] References Cited
UNITED STATES PATENTS

| | | | |
|---|---|---|---|
| 405,194 | 6/1889 | Williams | 310/14 |
| 425,038 | 4/1890 | Maynadier | 310/14 |
| 438,870 | 10/1890 | Todd | 310/12 |
| 751,857 | 2/1904 | Krause | 310/14 |
| 859,018 | 7/1907 | Smith | 104/148 LM X |
| 1,020,942 | 3/1912 | Bachelet | 310/14 |
| 2,041,607 | 5/1936 | Hopkins | 104/148 LM X |
| 3,225,228 | 12/1965 | Roshala | 104/148 LM X |
| 3,513,338 | 5/1970 | Poloujadoff | 104/148 LM X |
| 3,697,908 | 10/1972 | Highsmith | 104/148 LM |
| 3,750,275 | 8/1973 | Kay et al. | 336/205 X |
| 3,894,275 | 7/1975 | Baumans et al. | 310/12 X |

*Primary Examiner*—Trygve M. Blix
*Assistant Examiner*—Galen L. Barefoot
*Attorney, Agent, or Firm*—Lee C. Robinson, Jr.

[57] ABSTRACT

An electromagnetic transportation system for a vehicle which is adapted to travel along the inside of a tube. The system includes a series of electrical coils about the periphery of the tube which are connected to a three-phase alternating current supply. The vehicle is a capsule adapted to move within the tube and is essentially a ferro-magnetic container. The coils are energized by the three-phase alternating current supply to produce bundles of magnetic energy moving in one direction and the capsule is propelled by the magnetic energy in the same direction. The capsule also includes spaced coil members in order to utilize both radially and axially directed magnetic energy to propel the capsule in the tube and includes means to create a plurality of magnetic pole faces to increase the efficiency of propulsion.

10 Claims, 8 Drawing Figures

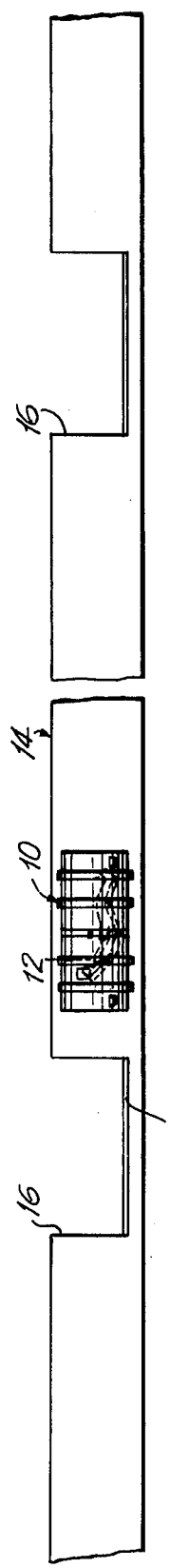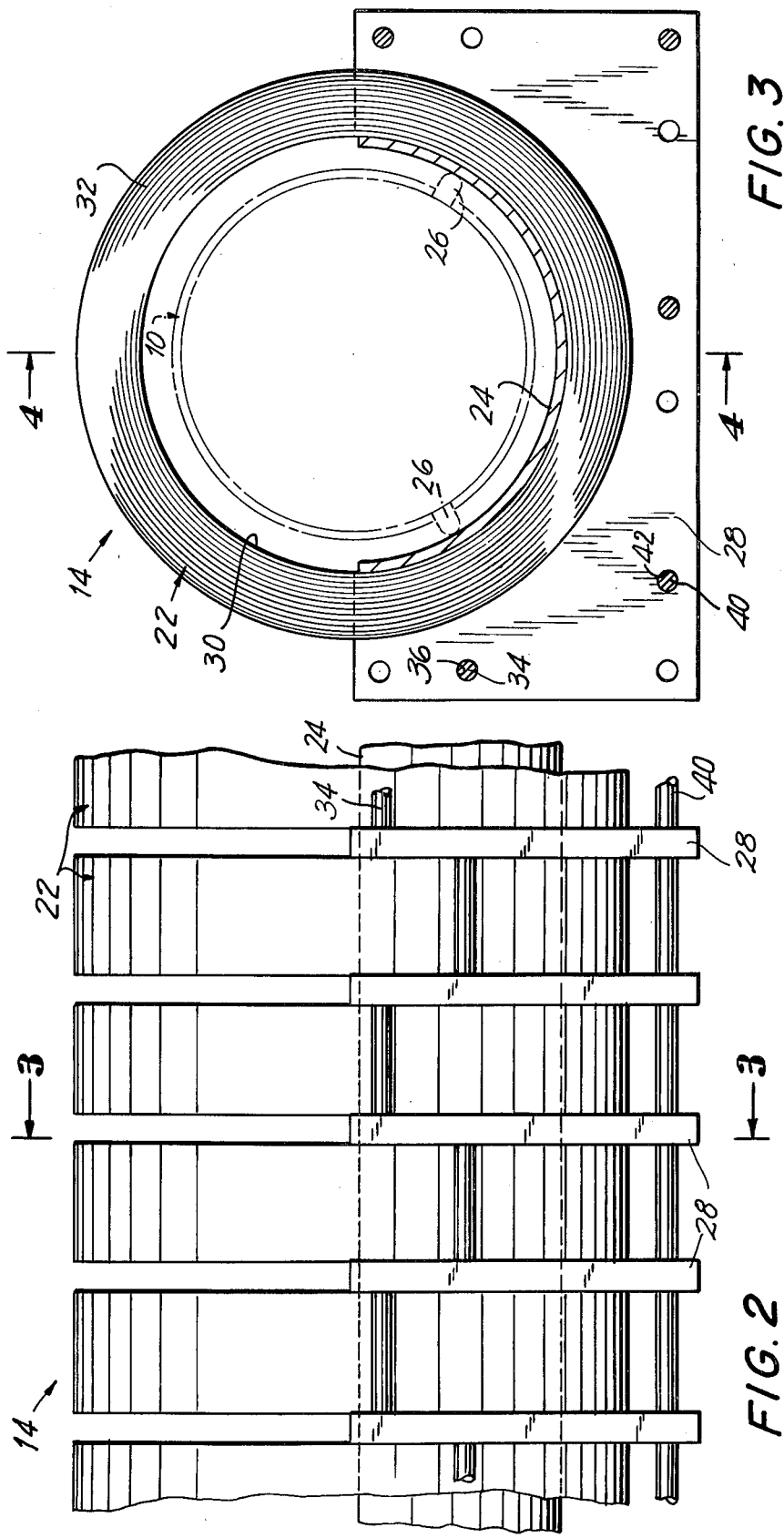

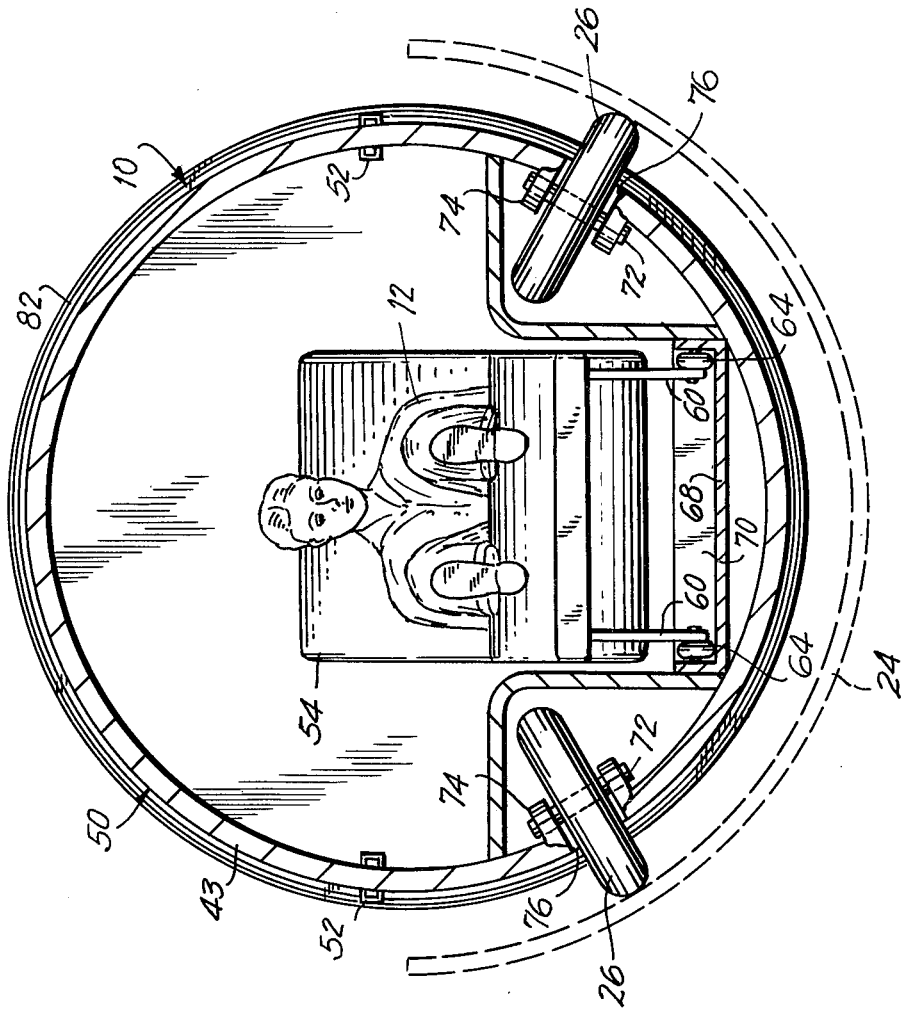
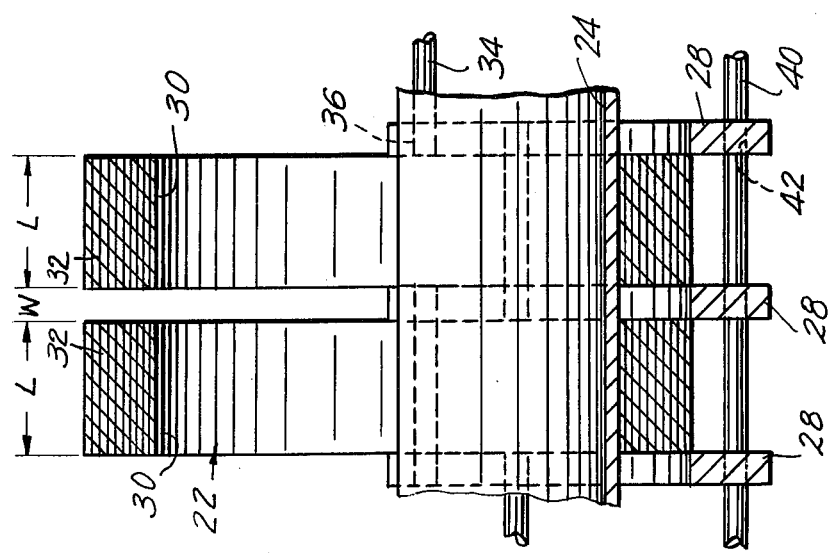

ELECTROMAGNETIC TRANSPORTATION SYSTEM

The present invention relates to transportation systems and more particularly to electromagnetic transportation systems wherein a vehicle in the form of a capsule is transported by energy in the form of electromagnetic energy through a tube.

The present invention utilizes a motor system which is a linear-three-phase-synchronous-hysteresis motor. Such a motor uses an electromagnetic propagation concept which may utilize a three-phase, 60 Hertz electrical power supply to energize electrical coils that are fixed adjacent to and coaxial with each other to form a long, three-phase solenoid in the form of a tube. The three-phase current flowing in the coils in proper sequence create a three-dimensional-axially moving magnetic flux field. A chain of magnetic bundles or envelopes moves along the tube with the major portion of the flux being concentrated near the inner periphery of the coils. The velocity of propagation of the three-dimensional magnetic envelopes is constant—as determined by the line frequency—and the axial lengths and interspacing of the coils.

Within the tube a capsule, which is large enough to accommodate one or more passengers, is provided. Preferably, the capsule has a cylindrical shell made of a ferro-magnetic material which may be cold rolled steel and the capsule couples to the magnetic flux bundles and concentrates the flux in its shell. The presence of the capsule enhances the flux of every coil that surrounds the capsule and this coupling or magnetizing of the capsule periphery provides the means by which the capsule is moved in a controlled fashion along the axial length of the solenoid tube. The capsule also includes an electrical coil arrangement to utilize both the axial thrust afforded by the electromagnetic field and radial components of the flux produced by the three-phase coils for propulsion. Provision is also made to provide for internal power generation for auxiliary power within the capsule by induction, for example to provide power for lighting within the capsule.

The invention may be understood by reference to the following description of a preferred embodiment and the drawings in which:

FIG. 1 is a schematic representation of a segment of the electromagnetic transportation system of the present invention;

FIG. 2 is an elevational view showing a representation of the stator coils within which the vehicle capsule travels;

FIG. 3 is an elevational view taken along the line 3—3 of FIG. 2;

FIG. 4 is a sectional view taken along the line 4—4 of FIG. 3;

FIG. 7 is a vertical sectional view taken along the line 6—6 of FIG. 5; and

Figure 5:
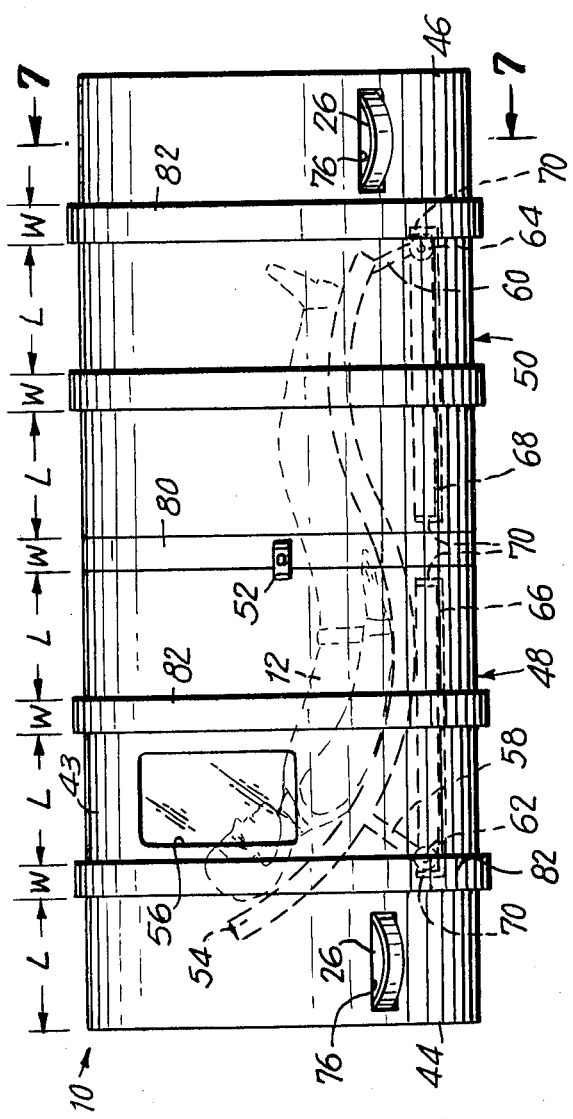
FIG. 5 is an elevational view of a preferred embodiment of the vehicle capsule of the present invention.

Referring to the drawing and particularly FIG. 1 an illustrative embodiment of the present invention is diagrammatically illustrated and shows a vehicle capsule 10 in the form of a cylindrical tube having an internal volume sufficient to accommodate one passenger 12 in a semi-reclined position. The vehicle capsule 10 is adapted to move within a guideway 14 under the action of electromagnetic propagation as will be explained more fully hereinafter.

Typically the system includes stations 16 at selected locations where the vehicle capsule 10 is stopped to allow for loading and unloading of passengers 12. The manner of passenger ingress and egress at stations 16 will be described more fully hereinbelow.

Reference is now made to FIGS. 2 through 4 for a schematic representation of the guideway 14 about which are disposed a plurality of spaced stator coils 22. Guideway 14 includes a bed 24 to support and accommodate wheel members 26 associated with the vehicle capsule 10. The bed 24 is preferably C-shaped in cross-section and is supported within the stator coils 22 by a plurality of support plates 28 disposed wthin the spaces between adjacent coils 22.

Each stator 22 is formed by winding a lightweight epoxy-coated aluminum tape about a removable coil or mandrel to form the individual coils. Thus, each coil 22 would comprise, as shown by the cross-sectional view in FIG. 4, a cylindrical opening 30 and layers of epoxy coated aluminum conductor strip 32 wound in the fashion of a roll of tape. The inner end of the coil of tape is electrically connected to the power source as is the outermost end so that current flow is through the continuous tape-wound strip of the aluminum conductor strip 32.

Figure 8:
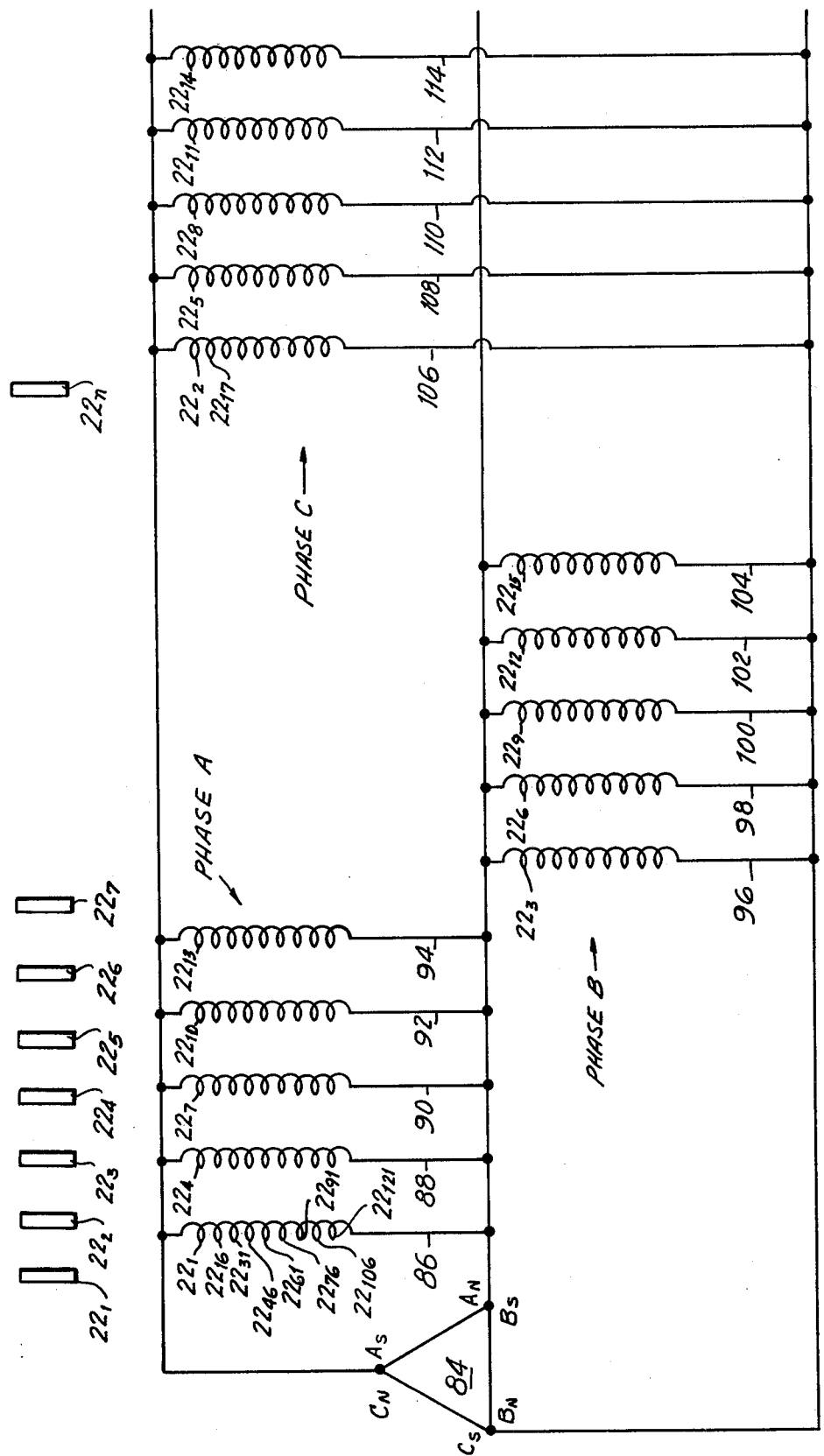
FIG. 8 is a schematic wiring diagram showing the manner in which the three-phase power source is connected to the stator coils forming the guideway in which the vehicle capsule travels.

As best seen in FIGS. 2 and 8, sets of adjacent stator coils 22 are electrically connected in series and a plurality of these sets or banks of series-connected stator coils are electrically connected in parallel for each phase of the three-phase power supply which energizes the stator coils. While the number of coils in each bank of series-connected coils and the number of banks connected in parallel may be varied in the illustrative embodiment described herein, nine coils are connected in series and five banks of nine series-connected stator coils are connected in parallel for each phase of the three-phase power supply.

The electrical interconnection in series and parallel of the respective banks of the stator coils are accomplished by interconnecting stator coils by electrically conductive bus bars. Thus the parallel connection between stator coils in a bank of series-connected coils is accomplished by bus bar mounted elements 34 through a bore 36 in support plate 28. Each support plate is suitably electrically connected to its respective adjacent coil 22 and by bus bar 34 to an adjacent coil 22 to make the parallel connection. A longer bus bar 40 disposed through bores 42 in support plate 28 connects selected coils in series with the next coil to lie connected in series.

Figure 6:
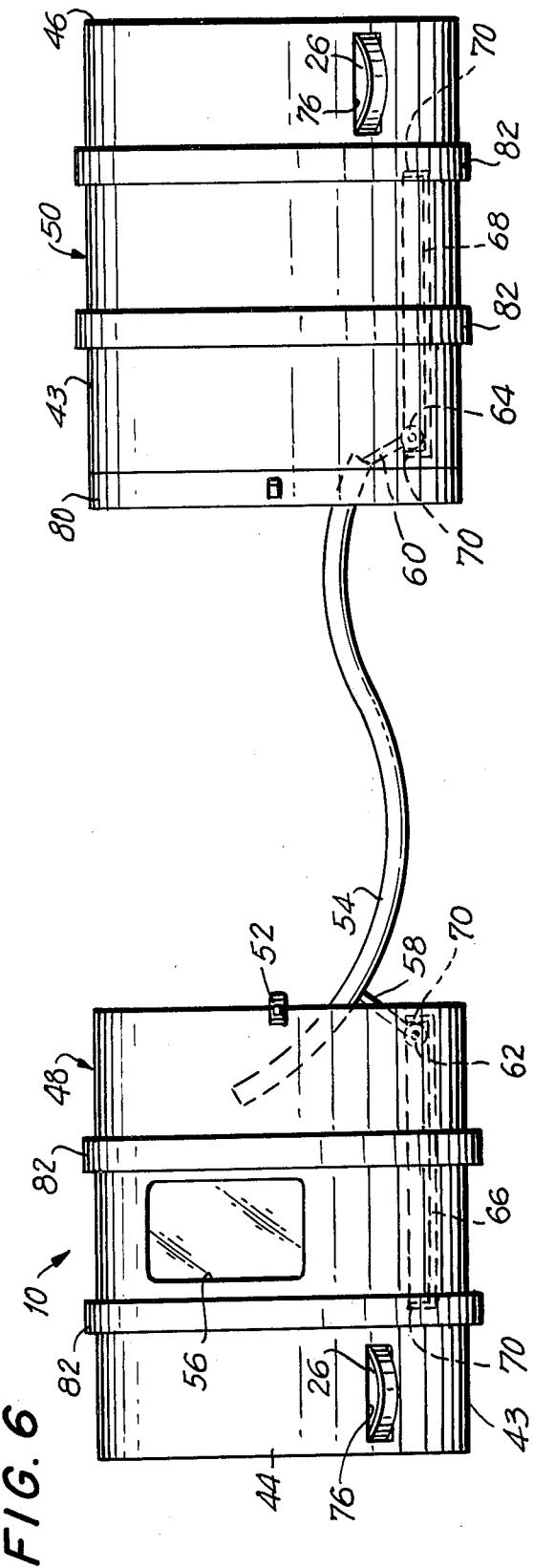
FIG. 6 is an elevational view of the vehicle capsule in the open position to permit passenger egress and ingress.

Reference is now made to FIGS. 5-7 for a description of a preferred embodiment for the vehicle capsule 10. Vehicle capsule 10 is preferably constructed from a ferro-magnetic material, for example cold rolled steel, and comprises a cylindrical wall member 43 and end wall members 44 and 46. Capsule 10 is preferably made in two half sections 48 and 50 releasably joined by a suitable latching mechanism 52 which can be operated from within and without the capsule to release the latching mechanism so that capsule half sections 48 and 50 may be physically separated.

A suitable seat 54 is provided within the capsule to accommodate the passenger in a semi-reclined position and window-ports 56 may be provided to permit passenger viewing.

The seat 54 is supported by a pair of bracket support members 58 and 60, respectively, at each end. The lowermost end of each pair of bracket members 58 and 60 have rotatably secured thereto roller members 62 and 64, respectively, which are disposed within opposed channel guideways 66 and 68, respectively, on each side of the respective capsule half sections 48 and 50. Each channel guideway includes a stop member 70 at each end of the channel to positively retain the roller member pairs 58 and 60 within the guideway.

The wheel members 26 are supported inboard within the capsule, for example on a wheel support shaft 72 mounted between shaft supports 74. Access slots 76 in cylindrical wall segment 43 are provided so that the lower peripheral extent of the wheel members 26 protrude from the capsule to ride on bed 24.

Passenger ingress and egress station 16 is a segment of the guideway 14 with at least the upper segment of coils eliminated to provide room for passenger ingress and egress. A suitable platform 78 is provided for passenger support. Capsule 10 is retained at station 16 and latch 52 operated to open the capsule half sections.

The half sections move readily apart as each half section rides on its supporting wheel members 26 within bed 24 of the guideway 14. Since the seat 54 is slidably supported on the channel guideways 66 and 68, the seat remains stationary while the capsule half sections continue to separate until the seat rollers 58 and 60 are restrained by the end stop 70. The stops 70 are so spaced that when the capsule half sections are moved together and latch 52 is closed to secure the capsule the seat is physically constrained to preclude sliding action within the channel guideways.

To provide for a slight degree of articulation so that the capsule 10 can readily navigate any curves within the guideway 14 one or more intermediate segments 80 of a non-magnetic material are provided. Each of the segments 80 are secured between sections of the capsule 10 so that, in essence, the capsule 10 is made up of a plurality of ferro-magnetic segments with the non-magnetic non-electrically conductive segment 80 therebetween. The material of the segment 80 is selected to provide sufficient rigidity to the capsule 10 but yet is sufficiently resilient to afford a slight degree of articulation to ease passage of the capsule around any curvatures in the guideway 14. In addition, making separate segments of the capsule 10 of magnetically discrete segments creates a greater number of pole pairs within the capsule itself which increases the efficiency of the capsule propagation through the guideway 14, as will be explained more fully hereinafter.

In addition, a plurality of spaced electrical coils 82 are provided about the exterior of the capsule. Each coil 82 is similar in construction to the stator coils 22 in that a strip of epoxy coated aluminum conductor is wound in the fashion of a roll of tape. Each coil 82 is individually shorted by electrically connecting one end of the strip to the other end of the strip. An accelerometer or velocity sensor 84 is provided within the capsule to sense when the capsule has reached synchronous velocity and actuates a circuit disconnect within the capsule to disconnect the shorting of the capsule coil 82. When capsule coil 82 is unshorted, as the capsule is moving along at a uniform velocity within the guideway 14, the induced voltage within the coil 82, induced therein due to the passage of the capsule through the magnetic field created by the three-phase power source on the stator coils, generates sufficient electrical energy to operate an auxiliary internal power supply within the capsule for lighting or other electrical accessories.

Ideally, the axial length between adjacent capsule coils 82, shown in FIG. 5 as L, is equal to the width of a stator coil 30, also shown as L in FIG. 4. The width of the capsule coil 82, shown as W in FIG. 5, is equal to the spacing between adjacent stator coils 30, shown as W in FIG. 4.

FIG. 8 shows a diagrammatic representation of the electrical circuit diagram for supplying energy to the transportation system of the present invention. As shown, a three-phase alternating power supply 84, which may be a readily available 60 Hertz power supply is connected across the groups of series-connected stator coils 22 with a plurality of such banks of series-connected stator coils being connected in parallel across each phase of the three-phase power supply 84.

As shown in FIG. 8, a segment of adjacent stator coils 22 are diagrammatically shown. Each coil in physically adjacent sequence is indicated by the designation $22_1$, $22_2$, $22_3$ ... $22_n$. In the schematic diagram of the electrical circuit the physical orientation of the series and parallel banks of stator coils relative to the physically sequential orientation of the coils along guideway 14 are indicated.

Thus, in the preferred embodiment, phase A of three phase power source 84 is impressed across banks 86, 88, 90, 92 and 94 of stator coils 22. Each bank includes nine series connected stator coils 22. Similarly, phase B of power source 84 is impressed across banks 96, 98, 100, 102 and 104 with each bank including nine series connected stator coils and phase C is impressed across banks 106, 108, 110, 112 and 114 of nine series connected stator coils 22 each.

Thus as shown for phase A of three phase power source 84, this phase is impressed across bank 86 which includes coil $22_1$, $22_{16}$, which is fifteen coils further along on guideway 14, coil $22_{31}$, $22_{46}$, $22_{61}$, $22_{76}$ and $22_{91}$ which are all 15 coils further along from the preceding. These coils are all interconnected in series as well. In like manner, phase A is also impressed across every fifteenth series connected coil of banks 88, 90, 92 and 94.

In like manner phase C of three phase power source 84 is impressed across banks 106–114, and phase B is impressed across banks 96–104, each of which banks includes nine series connected coils which are spaced every fifteenth coil down the line.

As the length of the guideway is increased, additional power sources are employed in similar electrical connection to power the guideway for any length desired.

In operation the stator coils surrounding the guideway 14 are connected to a three-phase power supply which, due to the geometry of the coil disposition, produces bundles of magnetic energy moving in one direction. The ferro-magnetic capsule is attracted to the moving bundles and moves in the direction of the bundles. The system can be operated with many capsules traveling in the same direction and the capsule itself is entirely passive, requiring no connections and no power supplied to it. Each capsule is therefore a relatively inexpensive passive device traveling down a powered guideway.

The system is in effect a linear-three-phase-synchronous-hysteresis motor. The magnetic field is moved electrically by using the three-phase connection and the stator coils are axially aligned. The direction of the magnetic fields produced are generally parallel to the direction of motion instead of being generally perpendicular to the direction of motion. In all known electromagnetic motors there are magnetic forces which are not used to produce mechanical energy. The largest of these are the forces produced between the ferro-magnetic materials and coils of induction machines. One of the beneficial aspects of the linear-three-phase-synchronous-hysteresis motor of the present invention is that because of its geometry it utilizes some of these magnetic forces to power the capsule along the guideway in a straight line.

The use of individual multiple coils wound about the capsule concentric to the axis of movement of the capsule utilizes some of the magnetic energy produced by the stator coils by induction action. By dimensioning the coils about the vehicle so that the width of these coils is equal to the width of the interspace between the stator track coils, this configuration optimizes the coupling of the capsule coils to the radial components of flux available from all of the stator coils. This is so because the stator radial flux component is dominant at the interval spacing between adjacent stator coils. The stator coils radial flux component act on these coils by induction to produce axial forces on the capsule coils and these axial forces act on the vehicle as it builds up to synchronous velocity. Thus, the windings of the capsule coils actually perform a motor powering function in that the radial flux components emanating from the stator track coils aid in accelerating and propelling the capsule through the stator coils via induction principles.

The axial components of the magnetic flux from the stator coils interact with the ferro-magnetic shell that serves as the capsule itself. This axial component serves to act as an attractive magnetic force that magnetizes the ferro-magnetic capsule and interacts with it. Performance by this axial component magnetic force may be further improved by using a capsule material having a higher hysteresis value than ordinary cold rolled steel. Additionally by constructing the capsule in discrete magnetic segments, i.e. by creating a plurality of non-magnetic buffer zones along the axial extent of the capsule, the number of magnetic pole faces are increased so that the magnetic flux produced by the stator coils acts on more magnetic pole faces per capsule to increase the efficiency of the system.

To summarize the parameters of interest which make the transportation system of the present invention operable, certain effects of the linear-three-phase-synchronous-hysteresis motor must be considered.

The strength of the field and its angle of incidence to the capsule will determine the applied force on the capsule. With a given set of coil characteristics this field can be best utilized by making the capsule as large in diameter as possible while still allowing free movement of the capsule within the tube. This not only reduces the air gap in the traditional way but also reduces the angle of incidence of the field on the capsule.

The material of the capsule and its thickness control the maximum amount of usable magnetic energy. The ferro-magnetic properties of the capsule are a complex topic but it is sufficient to note that in order to couple the capsule to the traveling field induced by the stator coils the capsule should be of a special length in relation to the traveling poles. Each moving capsule, however, may be made of as many sections of poles as is required by the particular application of the system. Briefly, the more poles per capsule means more thrust per capsule but it also means that there are fewer capsules per unit length of the system.

The electrical wiring of the coils of each phase along the length of the guideway will have an effect on dynamic characteristics of the system. Iron in a coil makes that coil more efficient and the power balance of coils which are in series with each other is effected by which coils have iron in them at any given time. This balance affects the strength of the field available to the capsule as it approaches a new coil. The precise series-parallel arrangement of the circuitry not only determines the load presented to the line, but also the performance of the system.

The size of the coils, the number of turns and the spacing between the coils are important. Here too, the specific application determines most of these characteristics. The spacing of coils (and the line frequency) determines the linear synchronous velocity which the capsule may attain in any system. It is believed that larger diameter coils can be made to run more efficiently because the tolerances of the air gap can be more easily made to be a smaller percentage of the total diameter therefore exponentially raising the percentage of usable flux in the system.

As noted above, there is a relationship between the capsule length and the spacing of the coils 82 about the capsule for optimum results in maximizing utilization of the thrust due to the magnetic field generated by the stator coils. Since the spacing of the coils about the capsule is correlated to the stator coil width and the spacing between the stator coils, the system is integrated to the extent that the geometry of the system dictates capsule length.

With reference to FIG. 5, an optimum length for the capsule is a pole face length that is 2W plus 3L where W is the width of the coil 82 about the capsule and the space between stator coils 22 and L is the axial distance between adjacent coils 82 and the width of a stator coil 22. The magnetic ends of the capsule extend slightly beyond the edges of the surrounding group of 3 stator coils 22. A next optimum capsule length would be 6L plus 5W as illustrated in FIG. 5, with one interspaced segment 80 of non-magnetic material having a width equal to the coil width W. The next optimum capsule size is 12L plus 11W in length, which capsule would contain 2 non-magnetic sections of length 1W each.

These capsule lengths will insure that the capsules have the same magnetic polarity—so as to repel each other when in close proximity. The coils wound on the capsule will couple to the radial flux in an optimum manner for induction motor action in order to provide inboard auxiliary power. The radial flux can be modulated at a fixed harmonic frequency and therefore an induction motor action will take place at synchronous velocity to allow utilization of inboard auxiliary power to run accessories without requiring electrical contact between the capsule and the power supply.

Because the same magnetic polarity will be applied to each capsule a capsule can be sensed when it approaches the vicinity of another capsule so that the system can be alerted and through appropriate logic circuitry the power supply to the area where the capsules are located can be varied in order to bring one or more of the capsules to a standstill to avoid collisions.

By utilizing the magnetic effect on the ferro-magnetic capsule, capsules move at a speed synchronous with the magnetic envelopes generated by the three phase power supply in the stator system. The system also lends itself for reversal of capsule motion by interchanging two phase connections of the three phase power supply.

In addition the stator design with its upper portion having an air space between adjacent stator coils provides for venting of the air pressures caused by capsule movement within the stator coils. The coil interspace has a venturi characteristic that reduces piston pressure effects within the stator tube. This open space also affords a visual sight path for capsule passengers.

The closed lower surface of the stator tube which functions as a roadbed also utilizes air film support effects to partially support moving capsules in an aerodynamic manner.

It is thus seen that the present invention provides an electromagnetic transportation system which uses principles of a linear-synchronous-hysteresis motor system in order to propel a vehicle capsule along a guideway in a safe, efficient and convenient manner.

What is claimed is:

1. An electromagnetic transportation system comprising:
   a vehicle capsule,
   a guideway to support said vehicle capsule,
   a plurality of spaced electrically conductive stator coils disposed about said guideway and about said capsule therein,
   a source of three-phase electrical energy connected across said stator coils,
   a plurality of said coils being connected in banks of series connections with a plurality of said banks of series connected coils connected in parallel across each phase of said three phase source of supply,
   said capsule comprising a substantially elongated member in an axial direction coextensive with the axial length of said guideway and being constructed of a ferro-magnetic material,
   said capsule further comprising spaced segments of non-ferro-magnetic material thereby to increase the efficiency of electromagnetic propagation of said capsule along said guideway,
   said capsule including wheel members adapted to roll along a portion of said guideway wherein said capsule is propelled along said guideway by electromagnetic propagation,
   said guideway comprises a channel support member disposed within said stator coils having a peripheral extent less than the internal peripheral extent of said stator coils thereby to support said vehicle capsule and to cooperate with said moving capsule to utilize aerodynamic support effects, and
   said stator coils being unconfined about a portion of their peripheral extent to provide for venting of air pressures generated by capsules moving within said coils.

2. An electromagnetic transportation system comprising:
   a vehicle capsule,
   a guideway to support said vehicle capsule,
   a plurality of spaced electrically conductive stator coils disposed about said guideway and about said capsule therein,
   a source of three-phase electrical energy connected across said stator coils,
   a plurality of said coils being connected in banks of series connections with a plurality of said banks of series connected coils connected in parallel across each phase of said three phase source of supply,
   said capsule comprising a substantially elongated member in an axial direction coextensive with the axial length of said guideway and being constructed of a ferro-magnetic material,
   said capsule further comprising spaced elements of non-ferro-magnetic material thereby to increase the efficiency of electromagnetic propagation of said capsule along said guideway,
   said capsule including wheel members adapted to roll along a portion of said guideway wherein said capsule is propelled along said guideway by electromagnetic propagation,
   said capsule including a plurality of spaced electrically conductive coils disposed about its periphery with the axis of said capsule coils being coextensive with the axial length of said guideway, and
   said capsule coils having a width at least equal to the spacing between adjacent stator coils about said guideway and being spaced from each other a distance at least equal to the width of said stator coils thereby to utilize radial flux components of said stator coils to aid in accelerating and propelling said capsule along said guideway.

3. An electromagnetic transportation system as defined in claim 2 wherein said capsule coils are shorted.

4. An electromagnetic transportation system as defined in claim 3 including means to unshort said capsule coils when said vehicle capsule has reached synchronous velocity along said guideway and means within said capsule to utilize the induced voltage in said capsule coils for auxiliary power requirements within said capsule.

5. An electromagnetic transportation system comprising:
   a vehicle capsule,
   a guideway to support said vehicle capsule,
   a plurality of spaced electrically conductive stator coils disposed about said guideway and about said capsule therein,
   a source of three-phase electrical energy connected across said stator coils,
   a plurality of said coils being connected in banks of series connections with a plurality of said banks of series connected coils connected in parallel across each phase of said three phase source of supply,
   said capsule comprising a substantially elongated member in an axial direction coextensive with the axial length of said guideway and being constructed of a ferro-magnetic material,
   said capsule including wheel members adapted to roll along a portion of said guideway wherein said capsule is propelled along said guideway by electromagnetic propogation,
   said capsule further comprising spaced segments of ferro-magnetic material interconnected by segments of non-ferro-magnetic material thereby to increase the number of magnetic pole faces in each capsule to increase the efficiency of electromagnetic propagation of said capsule along said guideway.

6. An electromagnetic transportation system as defined in claim 5 wherein said capsule includes a plurality of spaced electrically conductive coils disposed about its periphery with the axis of said capsule coils being coextensive with the axial length of said guideway, and said capsule coils having a width at least equal to the spacing between adjacent stator coils about said guideway and being spaced from each other a distance at least equal to the width of said stator coils thereby to utilize radial flux components of said stator coils to aid in accelerating and propelling said capsule along said guideway.

7. An electromagnetic capsule as defined in claim 6 wherein said capsule has an axial length at least equal to a multiple of the width of three stator coils plus the width of two interspaces between adjacent stator coils.

8. An electromagnetic transportation system as defined in claim 5 wherein each said stator coil comprises a plurality of windings of insulated electrically conductive material with each end of said winding connected in the electrical circuit of the system.

9. An electromagnetic transportation system as defined in claim 8 wherein said electrically conductive material is epoxy coated aluminum tape.

10. An electromagnetic transportation system as defined in claim 5 wherein said guideway comprises a channel support member disposed within said stator coils having a peripheral extent less than the internal peripheral extent of said stator coils thereby to support said vehicle capsule.

* * * * *